United States Patent
Matsuura

(10) Patent No.: US 11,938,742 B2
(45) Date of Patent: Mar. 26, 2024

(54) PRINTING APPARATUS

(71) Applicant: BROTHER KOGYO KABUSHIKI KAISHA, Nagoya (JP)

(72) Inventor: Kazunari Matsuura, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 122 days.

(21) Appl. No.: 17/813,095

(22) Filed: Jul. 18, 2022

(65) Prior Publication Data
US 2023/0031611 A1    Feb. 2, 2023

(30) Foreign Application Priority Data

Jul. 29, 2021    (JP) .................. 2021-124607

(51) Int. Cl.
| | |
|---|---|
| *B41J 29/393* | (2006.01) |
| *B41J 2/045* | (2006.01) |
| *B41J 2/21* | (2006.01) |
| *G06K 15/02* | (2006.01) |
| *G06K 15/00* | (2006.01) |

(52) U.S. Cl.
CPC ......... *B41J 2/2132* (2013.01); *B41J 2/04505* (2013.01); *B41J 29/393* (2013.01); *G06K 15/027* (2013.01); *B41J 2029/3935* (2013.01); *G06K 15/408* (2013.01)

(58) Field of Classification Search
CPC .... B41J 2/2132; B41J 2/04505; B41J 29/393; B41J 2029/3935; B41J 2/2135; B41J 2/2146; B41J 2202/21; G06K 15/027
See application file for complete search history.

(56) References Cited

U.S. PATENT DOCUMENTS

| | | |
|---|---|---|
| 2008/0252676 A1 | 10/2008 | Yasutani et al. |
| 2017/0013166 A1 | 1/2017 | Katsuyama |
| 2020/0307213 A1 | 10/2020 | Hirai et al. |

FOREIGN PATENT DOCUMENTS

| | | | |
|---|---|---|---|
| JP | 2008260166 A | | 10/2008 |
| JP | 2009234020 A | * | 10/2009 |
| JP | 2009234023 A | | 10/2009 |
| JP | 2016064634 A | | 4/2016 |
| JP | 2016087956 A | | 5/2016 |
| JP | 2020168739 A | | 10/2020 |

* cited by examiner

*Primary Examiner* — Julian D Huffman
(74) *Attorney, Agent, or Firm* — Scully, Scott, Murphy & Presser, PC

(57) ABSTRACT

A printing apparatus includes: a conveying roller which conveys a print medium in a conveying direction; a line head having first and second nozzle rows arranged in the conveying direction; and a controller. Each of the first and second nozzle rows includes nozzles aligned along a width direction orthogonal to the conveying direction. The nozzles are configured to discharge liquid, and the nozzles in the first nozzle row and the nozzles in the second nozzle row are shifted in the width direction. The first nozzle row has: first nozzles forming a group; and second nozzles forming a group adjacently in the width direction to the group of first nozzles in the first nozzle row. The second nozzle row has: first nozzles forming a group; and second nozzles forming a group adjacently in the width direction to the group of first nozzles in the second nozzle row.

11 Claims, 6 Drawing Sheets

PRINTING APPARATUS

CROSS REFERENCE TO RELATED APPLICATIONS

The present application claims priority from Japanese Patent Application No. 2021-124607, filed on Jul. 29, 2021, the disclosure of which is incorporated herein by reference in its entirety.

BACKGROUND

The present teaching relates to a printing apparatus.

Up to now, there is known a printing apparatus having a line head in which a plurality of nozzles is disposed over an entire width of an image forming region of a print medium. In the line head, the plurality of nozzles is arranged along a direction oblique to both a conveying direction of the print medium and a width direction orthogonal to the conveying direction, and thereby form a nozzle row.

SUMMARY

In the above-described printing apparatus, ink is discharged from the nozzles while the print medium is conveyed in the conveying direction, and printing is thereby performed on the print medium by using the ink. However, there is a risk that if an error occurs in a conveying distance of the print medium conveyed by conveying rollers, then the ink will not land on a predetermined position of the print medium, and image quality will be lowered.

The present teaching, which was made in order to solve such a problem, has an object of providing a printing apparatus by which lowering of image quality due to error in conveyance of a print medium can be reduced.

According to an aspect of the present teaching, there is provided a printing apparatus including:
- a conveying roller configured to convey a print medium in a conveying direction;
- a line head having a first nozzle row and second nozzle row arranged in the conveying direction, each of the first nozzle row and the second nozzle row including a plurality of nozzles aligned along a width direction orthogonal to the conveying direction, the nozzles being configured to discharge liquid, the nozzles of the first nozzle row and the nozzles of the second nozzle row being shifted in the width direction; and
- a controller,
- wherein the first nozzle row includes: a plurality of first nozzles forming a group; and a plurality of second nozzles forming a group adjacently, in the width direction, to the group of the first nozzles in the first nozzle row,
- the second nozzle row is positioned upstream in the conveying direction from the first nozzle row and includes: a plurality of first nozzles forming a group; and a plurality of second nozzles forming a group adjacently, in the width direction, to the group of the first nozzles in the second nozzle row,
- the controller is configured to:
- store print data of a correction-pattern image in which a first positional shift amount between a first dot and a second dot in the conveying direction and a second positional shift amount between a third dot and a fourth dot in the conveying direction differ from each other, the first dot being a landing position on the print medium of the liquid discharged from one of the first nozzles in the first nozzle row, the second dot being a landing position on the print medium of the liquid discharged from one of the first nozzles in the second nozzle row, the third dot being a landing position on the print medium of the liquid discharged from one of the second nozzles in the first nozzle row, the fourth dot being a landing position on the print medium of the liquid discharged from one of the second nozzles in the second nozzle row; and
- cause the liquid to be discharged from the nozzles while causing the print medium to be conveyed, such that a plurality of the correction-pattern images will be printed on the print medium based on the print data with an interval being provided therebetween in the conveying direction.

The present teaching displays an advantage of being able to provide a printing apparatus which has the above-described configuration and by which lowering of image quality due to error in conveyance of a print medium can be reduced.

The above-described object, other objects, features, and advantages of the present teaching will become clear from the following detailed description of preferred embodiments which is made with reference to the accompanying drawings.

DETAILED DESCRIPTION

<Printing Apparatus>

Figure 1:
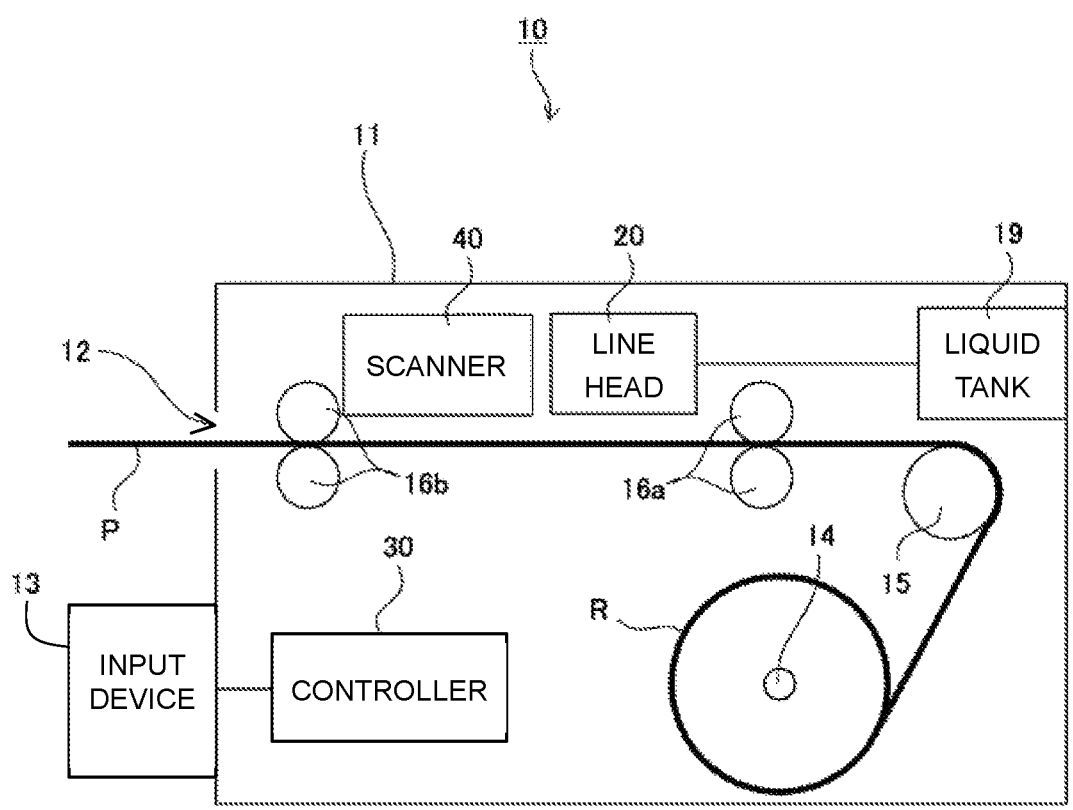
FIG. 1 is a diagram schematically depicting a printing apparatus according to an embodiment of the present teaching.
Figure 1:
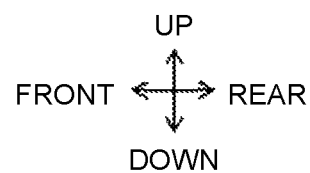

As depicted in FIG. 1, a printing apparatus 10 is a device that discharges a liquid from a line head 20 to print an image on a print medium P. There will be described below a label printer as an example of the printing apparatus 10. However, the printing apparatus 10 may be applied too to the likes of an ink jet printer in addition to a label printer. The liquid is ink, or the like, and the print medium P is a sheet such as a paper sheet.

The printing apparatus 10 comprises a housing 11. In one side surface of the housing 11, there opens a discharge port 12 that discharges the print medium P. Note that in the housing 11, a side where the discharge port 12 opens will be referred to as front, and an opposite side to that side will be referred to as rear. Directions orthogonal to this front-rear direction and orthogonal to each other will be referred to as a left-right direction and an up-down direction. However, directions of disposition of the printing apparatus 10 are not limited to these. Moreover, the front-rear direction is a conveying direction of the print medium P that it opposes the line head 20, and the left-right direction is a width direction.

The discharge port 12, which has a rectangular shape extending in the left-right direction, communicates inside and outside of the housing 11. A front surface of the housing 11 is provided with an input device 13 such as a touch panel or button. By a user operating the input device 13, various kinds of settings or instructions are accepted by the input device 13, and signals appropriate to the operation thereby outputted from the input device 13.

On the inside of the housing 11, there is provided a roll holder 14 that holds a roll R. The roll R is the print medium P of long shape that has been wound around a cylindrically-shaped roll core. The roll holder 14 has a circular columnar shape, and a central axis of the roll holder 14 extends in the left-right direction. The roll holder 14 is inserted inside the roll core of the roll R, and the roll R is thereby held by the roll holder 14.

Moreover, a direction-changing roller 15 is provided inside the casing 11 upwardly rearward of the roll holder 14. The direction-changing roller 15 has a circular columnar shape, and a central axis of the direction-changing roller 15 extends in the left-right direction. The print medium P is drawn out toward a rear side of the direction-changing roller 15 from the roll R, and arranged along a peripheral surface of the direction-changing roller 15, thereby having its direction changed to frontwards.

Moreover, a pair of rear-side conveying rollers 16a and pair of front-side conveying rollers 16b are provided inside the casing 11 between the direction-changing roller 15 and the discharge port 12. The rear-side conveying rollers 16a, the front-side conveying rollers 16b, and the discharge port 16 are lined up in this order frontward from the direction-changing roller 15. The conveying rollers 16a, 16b have a circular columnar shape, and central axes of each of the conveying rollers 16a, 16b extend in the left-right direction. The pair of rear-side conveying rollers 16a are aligned in the up-down direction with respect to each other, and the pair of front-side conveying rollers 16b are aligned in the up-down direction with respect to each other.

One of the pair of rear-side conveying rollers 16a and one of the pair of front-side conveying rollers 16b rotate due to a conveying motor 17 (FIG. 2) and thereby convey frontward the print medium P. As a result, the print medium P is conveyed frontward by the pair of rear-side conveying rollers 16a, sandwiched between the pair of rear-side conveying rollers 16a, after having its direction changed to the front side by the direction-changing roller 15. Furthermore, the print medium P is conveyed frontward by the pair of front-side conveying rollers 16b, sandwiched between the pair of front-side conveying rollers 16b to be discharged frontward from the discharge port 12.

Furthermore, the line head 20 is provided inside the housing 11 between the pair of rear-side conveying rollers 16a and pair of front-side conveying rollers 16b. The line head 20 is disposed above a conveying path of the print medium P, and a lower surface of the line head 20 opposes an upper surface of the print medium P. The conveying path of the print medium P passes through a gap between the pair of rear-side conveying rollers 16a and gap between the pair of front-side conveying rollers 16b. The line head 20 applies a pressure to liquid inside the line head 20 using a drive element 18 (FIG. 2) such as a piezoelectric element, and thereby discharges the liquid onto the upper surface of the print medium P. As a result, an image is printed on the upper surface of the print medium P. The line head 20 is connected with a liquid tank 19 storing the liquid, and is supplied with the liquid by the liquid tank 19.

<Head>

Figure 3:
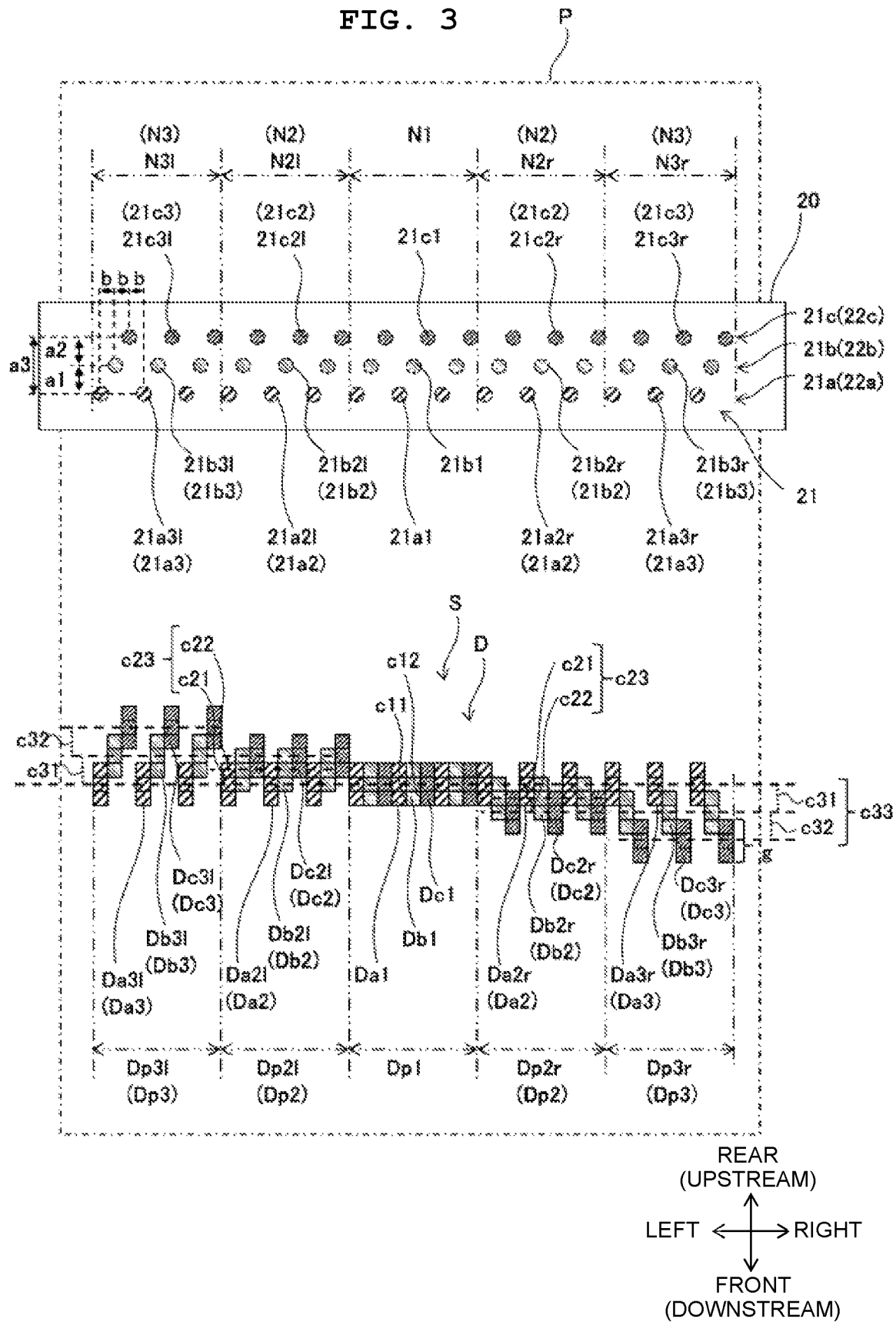
FIG. 3 is a diagram schematically depicting a head and a correction-pattern image viewed from above.

FIG. 3 represents the line head 20 and a correction-pattern image S printed on the print medium P, viewed from an upper side. The line head 20 has a plurality of nozzles 21. The plurality of nozzles 21 open in the lower surface of the line head 20. Note that the nozzle 21 of FIG. 3 represents a position of the nozzle 21 in the line head 20 when viewed from an upper side. Moreover, in FIG. 3, for convenience of explanation, the same pattern of shading is used to represent the nozzle 21 and dot D of the correction-pattern image S formed by liquid discharged from that nozzle 21. Moreover, regarding elements that form a pair in the left-right direction in FIG. 3, sometimes, the element on the left side will have its reference number assigned with a suffix "l", and the element on the right side will have its reference number assigned with a suffix "r".

The plurality of nozzles 21 are connected to the same liquid tank 19 (FIG. 1) as each other, and discharge liquid supplied from that liquid tank 19. Therefore, the plurality of nozzles 21 in the line head 20 discharge the same color of liquid as each other.

The plurality of nozzles 21 are disposed over a length corresponding to maximum width of an image forming region in the left-right direction in the print medium P. The plurality of nozzles 21 are divided into a plurality of nozzle rows in the front-rear direction. Moreover, the plurality of nozzles 21 are divided into a plurality of nozzle groups in the left-right direction.

<Nozzle Row>

The plurality of nozzles 21 form a plurality (for example, three) of the nozzle rows. Each nozzle row is formed by a plurality of the nozzles 21 arranged in a line in the left-right direction. The three nozzle rows include a downstream nozzle row 22a, a middle nozzle row 22b, and an upstream nozzle row 22c.

The downstream nozzle row 22a, the middle nozzle row 22b, and the upstream nozzle row 22c are aligned from the front side in this order, with predetermined intervals provided therebetween in the front-rear direction. In the front-rear direction, an interval a1 between the downstream nozzle row 22a and middle nozzle row 22b and an interval a2 between the middle nozzle row 22b and upstream nozzle row 22c are equal to each other.

The downstream nozzle row 22a, which is a first nozzle row, has a plurality of downstream nozzles 21a. The middle nozzle row 22b, which is a second nozzle row, has a plurality of middle nozzles 21b. The upstream nozzle row 22c, which is a third nozzle row, has a plurality of upstream nozzles 21c.

The plurality of downstream nozzles 21a are arranged in a line with a predetermined interval 3b provided therebetween in the left-right direction in the downstream nozzle row 22a. The plurality of middle nozzles 21b are arranged in a line with a predetermined interval 3b provided therebetween in the left-right direction in the middle nozzle row 22b. The plurality of upstream nozzles 21c are arranged in a line with a predetermined interval 3b provided therebetween in the left-right direction in the upstream nozzle row 22c.

Moreover, when viewed from the front side, the downstream nozzle 21a, middle nozzle 21b, and upstream nozzle 21c are lined up in this order from the left side, out of alignment with each other in the left-right direction. A nozzle interval b being an interval between the downstream nozzle 21a and middle nozzle 21b adjacent to each other in the left-right direction, a nozzle interval b being an interval between the middle nozzle 21b and upstream nozzle 21c adjacent to each other in the left-right direction, and a nozzle interval b being an interval between the upstream nozzle 21c and downstream nozzle 21a adjacent to each other in the left-right direction are equal to each other.

As a result, the downstream nozzle row 22a and middle nozzle row 22b are aligned in the front-rear direction such that the plurality of downstream nozzles 21a and plurality of middle nozzles 21b are aligned in a zigzag manner along the left-right direction. Moreover, the middle nozzle row 22b and upstream nozzle row 22c are aligned in the front-rear direction such that the plurality of middle nozzles 21b and plurality of upstream nozzles 21c are aligned in a zigzag manner along the left-right direction. Moreover, the downstream nozzle 21a, middle nozzle 21b, and upstream nozzle 21c are arranged in a line in an oblique direction inclined with respect to each of the left-right direction and front-rear direction.

[Nozzle Group]

The plurality of nozzles 21 form a plurality (for example, three) of the nozzle groups. The plurality of nozzle groups includes, for example, a first nozzle group N1, a second nozzle group N2, and a third nozzle group N3. Furthermore, the second nozzle group N2 includes a left-side second nozzle group N2l and right-side second nozzle group N2r, and the third nozzle group N3 includes a left-side third nozzle group N3l and right-side third nozzle group N3r. The left-side third nozzle group N3l, left-side second nozzle group N2l, first nozzle group N1, right-side second nozzle group N2r, and right-side third nozzle group N3r are aligned from the left side in this order.

Therefore, the plurality of downstream nozzles 21a in the downstream nozzle row 22a include a downstream first nozzle 21a1, a left-side downstream second nozzle 21a2l, a right-side downstream second nozzle 21a2r, a left-side downstream third nozzle 21a3l, and a right-side downstream third nozzle 21a3r, depending on the nozzle group.

The downstream first nozzle 21a1, which is the downstream nozzle 21a of the first nozzle group N1, is a first nozzle of the downstream nozzle row 22a. The left-side downstream second nozzle 21a2l, which is the downstream nozzle 21a of the left-side second nozzle group N2l, is a one-side second nozzle of the downstream nozzle row 22a. The right-side downstream second nozzle 21a2r, which is the downstream nozzle 21a of the right-side second nozzle group N2r, is an other-side second nozzle of the downstream nozzle row 22a. The left-side downstream third nozzle 21a3l, which is the downstream nozzle 21a of the left-side third nozzle group N3l, is a one-side third nozzle of the downstream nozzle row 22a. The right-side downstream third nozzle 21a3r, which is the downstream nozzle 21a of the right-side third nozzle group N3r, is an other-side third nozzle of the downstream nozzle row 22a.

Moreover, the plurality of middle nozzles 21b in the middle nozzle row 22b include a middle first nozzle 21b1, a left-side middle second nozzle 21b2l, a right-side middle second nozzle 21b2r, a left-side middle third nozzle 21b3l, and a right-side middle third nozzle 21b3r, depending on the nozzle group.

The middle first nozzle 21bl, which is the middle nozzle 21b of the first nozzle group N1, is a first nozzle of the middle nozzle row 22b. The left-side middle second nozzle 21b2l, which is the middle nozzle 21b of the left-side second nozzle group N2l, is a one-side second nozzle of the middle nozzle row 22b. The right-side middle second nozzle 21b2r, which is the middle nozzle 21b of the right-side second nozzle group N2r, is an other-side second nozzle of the middle nozzle row 22b. The left-side middle third nozzle 21b3l, which is the middle nozzle 21b of the left-side third nozzle group N3l, is a one-side third nozzle of the middle nozzle row 22b. The right-side middle third nozzle 21b3r, which is the middle nozzle 21b of the right-side third nozzle group N3r, is an other-side third nozzle of the middle nozzle row 22b.

Furthermore, the plurality of upstream nozzles 21c in the upstream nozzle row 22c include an upstream first nozzle 21c1, a left-side upstream second nozzle 21c2l, a right-side upstream second nozzle 21c2r, a left-side upstream third nozzle 21c3l, and a right-side upstream third nozzle 21c3r, depending on the nozzle group.

The upstream first nozzle 21c1, which is the upstream nozzle 21c of the first nozzle group N1, is a first nozzle of the upstream nozzle row 22c. The left-side upstream second nozzle 21c2l, which is the upstream nozzle 21c of the left-side second nozzle group N2l, is a one-side second nozzle of the upstream nozzle row 22c. The right-side upstream second nozzle 21c2r, which is the upstream nozzle 21c of the right-side second nozzle group N2r, is an other-side second nozzle of the upstream nozzle row 22c. The left-side upstream third nozzle 21c3l, which is the upstream nozzle 21c of the left-side third nozzle group N3l, is a one-side third nozzle of the upstream nozzle row 22c. The right-side upstream third nozzle 21c3r, which is the upstream nozzle 21c of the right-side third nozzle group N3r, is an other-side third nozzle of the upstream nozzle row 22c.

<Controller>

Figure 2:
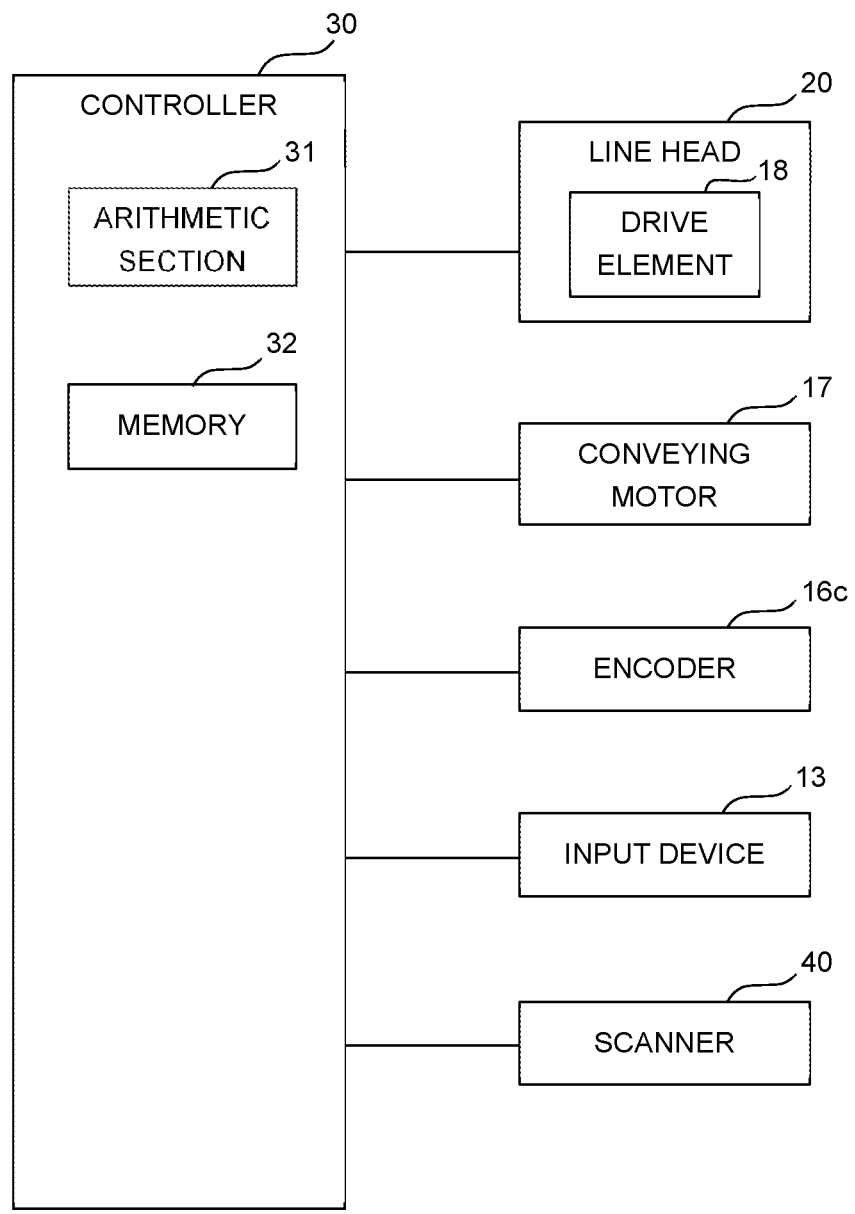
FIG. 2 is a functional block diagram depicting configuration of the printing apparatus.

The printing apparatus 10 comprises a controller 30, as depicted in FIG. 1. The controller 30 is electrically connected to the drive element 18 of the line head 20, the conveying motor 17, and an encoder 16c, as depicted in FIG. 2. The encoder 16c, which is fitted to rotating shafts of either of the conveying rollers 16a, 16b (FIG. 1) of the plurality of conveying rollers 16a, 16b, outputs to the controller 30 a pulse signal corresponding to rotational position of the conveying rollers 16a, 16b.

In addition, the controller 30 has an arithmetic section 31 and a storage section 32. The storage section 32, which is a memory accessible from the arithmetic section 31, has a ROM and a RAM, for example. The ROM stores the likes of a program to be executed by a CPU and various kinds of data. The RAM temporarily stores the likes of data to be employed in execution of the program.

The arithmetic section 31, which includes a circuit such as the CPU, executes the program stored in the storage section 32. The arithmetic section 31 controls each of sections such as the drive element 18 and conveying motor 17 based on the pulse signal from the encoder 16c, and thereby executes various kinds of processing such as print processing.

<Print Processing>

The controller 30 causes liquid to be discharged from the line head 20 by driving the drive element 18, while at the same time causing the conveying rollers 16a, 16b to rotate by driving the conveying motor 17, based on print data and the pulse signal of the encoder 16c.

Now, the print medium P moves frontwards according to rotation of the conveying rollers 16a, 16b. In response, the controller 30 acquires a position in the front-rear direction of the print medium P with respect to the line head 20 based on the pulse signal of the encoder 16a of the conveying rollers 16a, 16b. Then, in order that liquid will land on a position of the print medium P corresponding to a dot position of the print data, the controller 30 every drive cycle inputs the drive element 18 of the line head 20 with a drive signal based on the print data.

The drive element 18 is driven according to the drive signal, and liquid is discharged from the nozzle 21 corresponding to the drive element 18. As a result, the liquid lands on the print medium P, and the dot D is formed at a landing position. In this way, the position of the dot D is defined by rotational speed of the conveying rollers 16a, 16b and drive time of the drive element 18.

However, if diameter of the conveying rollers 16a, 16b differs from a predetermined diameter or the print medium P slips with respect to the rotating conveying rollers 16a, 16b, then conveying speed of the print medium P conveyed by the conveying rollers 16a, 16b and moving speed of the print medium P based on the encoder 16c will differ. As a result, the position of the dot D in the print medium P will end up shifting from a predetermined position based on the print data, and image quality will end up lowering. Accordingly, in order to reduce lowering of image quality due to error in conveyance of the print medium P, the controller 30 prints the correction-pattern image S on the print medium P.

<Print Data of Correction-Pattern Image>

The controller 30 stores print data of the correction-pattern image S in the storage section 32. The print data of the correction-pattern image S defines the dot D being a landing position on the print medium P of liquid discharged from each of the nozzles 21 in the case of the print medium P having been conveyed at the predetermined speed by the conveying rollers 16a, 16b.

As depicted in FIG. 3, in the correction-pattern image S, the plurality of dots D is linearly aligned continuously in the front-rear direction. As a result, the correction-pattern image S has a length g in the front-rear direction, and the correction-pattern image S becomes easy to see. The length g, which is the number of dots D arranged in a line in the front-rear direction in the correction-pattern S, is, for example, three dots D. Note that the number of dots D aligned in the front-rear direction may be one.

In the correction-pattern image S, the plurality of dots D are also aligned in the left-right direction along an arranging direction of the nozzles 21 in the line head 20, in addition to being aligned in the front-rear direction. In the left-right direction, the correction-pattern image S includes a first dot pattern image Dp1 due to the first nozzle group N1, a second dot pattern image Dp2 due to the second nozzle group N2, and a third dot pattern image Dp3 due to the third nozzle group N3.

The second dot pattern image Dp2 includes a left-side second dot pattern image Dp2*l* and a right-side second dot pattern image Dp2*r*. The left-side second dot pattern image Dp2*l* is a one-side second dot pattern image formed by the left-side second nozzle group N2*l*. The right-side second dot pattern image Dp2*r* is an other-side second dot pattern image formed by the right-side second nozzle group N2*r*.

The third dot pattern image Dp3 includes a left-side third dot pattern image Dp3*l* and a right-side third dot pattern image Dp3*r*. The left-side third dot pattern image Dp3*l* is a one-side third dot pattern image formed by the left-side third nozzle group N3*l*. The right-side third dot pattern image Dp3*r* is an other-side third dot pattern image formed by the right-side third nozzle group N3*r*.

In the correction-pattern image S, the left-side third dot pattern image Dp3*l*, the left-side second dot pattern image Dp2*l*, the first dot pattern image Dp1, the right-side second dot pattern image Dp2*r*, and the right-side third dot pattern image Dp3*r* are aligned in this order from the left. Positional shift amounts of the dots D in the front-rear direction are defined so as to differ for each of the dot pattern images.

That is, the first dot pattern image Dp1 includes a downstream first dot Da1, a middle first dot Db1, and an upstream first dot Dc1. The downstream first dot Da1, middle first dot Db1, and upstream first dot Dc1 are arranged in a line in this order from the left.

The downstream first dot Da1, which is the dot D formed by liquid discharged from the downstream first nozzle 21a1, corresponds to a first dot being a landing position on the print medium P of liquid discharged from the first nozzle of the first nozzle row. The middle first dot Db1, which is the dot D formed by liquid discharged from the middle first nozzle 21b1, corresponds to a second dot being a landing position on the print medium P of liquid discharged from the first nozzle of the second nozzle row. The upstream first dot Dc1, which is the dot D formed by liquid discharged from the upstream first nozzle 21c1, corresponds to a fifth dot being a landing position on the print medium P of liquid discharged from the first nozzle of the third nozzle row.

A first positional shift amount c11 of the downstream first dot Da1 and middle first dot Db1 and positional shift amount c12 of the middle first dot Db1 and upstream first dot Dc1 in the front-rear direction are both 0 (zero). In this case, the first dot pattern image Dp1 is a dot pattern in the case of the print medium P being conveyed by the conveying rollers 16a, 16b a predetermined distance d per unit time (at a predetermined speed d). Note that the first positional shift amount c11 may be larger than 0 (zero), provided it is smaller than a later-mentioned second positional shift amount c2*l*.

The left-side second dot pattern image Dp2*l* includes a left-side downstream second dot Da2*l*, a left-side middle second dot Db2*l*, and a left-side upstream second dot Dc2*l*. The left-side downstream second dot Da2*l*, which is the dot D formed by liquid discharged from the left-side downstream second nozzle 21a2*l*, corresponds to a one-side third dot being a landing position on the print medium P of liquid discharged from the one-side second nozzle of the first nozzle row. The left-side middle second dot Db2*l*, which is the dot D formed by liquid discharged from the left-side middle second nozzle 21b2*l*, corresponds to a one-side fourth dot being a landing position on the print medium P of liquid discharged from the one-side second nozzle of the second nozzle row. The left-side upstream second dot Dc2*l* is the dot D formed by liquid discharged from the left-side upstream second nozzle 21c2*l*.

The left-side downstream second dot Da2*l*, left-side middle second dot Db2*l*, and left-side upstream second dot Dc2*l* are lined up rightwards, while being shifted out of alignment rearwards, in this order. In the front-rear direction, the left-side middle second dot Db2*l* is disposed further to the rear side than the left-side downstream second dot Da2*l*, and the left-side upstream second dot Dc2*l* is disposed further to the rear side than the left-side middle second dot Db2*l*.

A second positional shift amount c21 of the left-side downstream second dot Da2*l* and left-side middle second dot Db2*l* and second positional shift amount c21 of the left-side middle second dot Db2*l* and left-side upstream second dot Dc2*l* in the front-rear direction are 0.002 d, for example. In this case, the left-side second dot pattern image Dp2*l* is a dot pattern in the case of conveying distance that the print medium P is conveyed per unit time being longer than the predetermined conveying distance d by 0.2% of the conveying distance d, and conveying speed of the print medium P being 0.2% faster than predetermined speed d.

The right-side second dot pattern image Dp2r includes a right-side downstream second dot Da2r, a right-side middle second dot Db2r, and a right-side upstream second dot Dc2r. The right-side downstream second dot Da2r, which is the dot D formed by liquid discharged from the right-side downstream second nozzle 21a2r, corresponds to an other-side third dot being a landing position on the print medium P of liquid discharged from the other-side second nozzle of the first nozzle row. The right-side middle second dot Db2r, which is the dot D formed by liquid discharged from the right-side middle second nozzle 21b2r, corresponds to an other-side fourth dot being a landing position on the print medium P of liquid discharged from the other-side second nozzle of the second nozzle row. The right-side upstream second dot Dc2r is the dot D formed by liquid discharged from the right-side upstream second nozzle 21c2r.

The right-side downstream second dot Da2r, right-side middle second dot Db2r, and right-side upstream second dot Dc2r are lined up rightwards, while being shifted out of alignment frontwards, in this order. In the front-rear direction, the right-side middle second dot Db2r is disposed further to the front side than the right-side downstream second dot Da2r, and the right-side upstream second dot Dc2r is disposed further to the front side than the right-side middle second dot Db2r.

A second positional shift amount c21 of the right-side downstream second dot Da2r and right-side middle second dot Db2r and positional shift amount c22 of the right-side middle second dot Db2r and right-side upstream second dot Dc2r in the front-rear direction are 0.002 d, for example. In this case, the right-side second dot pattern image Dp2r is a dot pattern in the case of conveying distance that the print medium P is conveyed per unit time being shorter than the predetermined conveying distance d by 0.2% of the conveying distance d, and conveying speed of the print medium P being 0.2% slower than predetermined speed d.

The left-side third dot pattern image Dp3l includes a left-side downstream third dot Da3l, a left-side middle third dot Db3l, and a left-side upstream third dot Dc3l. The left-side downstream third dot Da3l is the dot D formed by liquid discharged from the left-side downstream third nozzle 21a3l. The left-side middle third dot Db3l is the dot D formed by liquid discharged from the left-side middle third nozzle 21b3l. The left-side upstream third dot Dc3l is the dot D formed by liquid discharged from the left-side upstream third nozzle 21c3l.

The left-side downstream third dot Da3l, left-side middle third dot Db3l, and left-side upstream third dot Dc3l are lined up rightwards, while being shifted out of alignment rearwards, in this order. A positional shift amount c31 of the left-side downstream third dot Da3l and left-side middle third dot Db3l and positional shift amount c32 of the left-side middle third dot Db3l and left-side upstream third dot Dc3l in the front-rear direction are 0.004 d, for example. In this case, the left-side third dot pattern image Dp3l is a dot pattern in the case of conveying distance that the print medium P is conveyed per unit time being shorter than the predetermined conveying distance d by 0.4% of the conveying distance d, and conveying speed of the print medium P being 0.4% slower than predetermined speed d.

The right-side third dot pattern image Dp3r includes a right-side downstream third dot Da3r, a right-side middle third dot Db3r, and a right-side upstream third dot Dc3r. The right-side downstream third dot Da3r is the dot D formed by liquid discharged from the right-side downstream third nozzle 21a3r. The right-side middle third dot Db3r is the dot D formed by liquid discharged from the right-side middle third nozzle 21b3r. The right-side upstream third dot Dc3r is the dot D formed by liquid discharged from the right-side upstream third nozzle 21c3r.

The right-side downstream third dot Da3r, right-side middle third dot Db3r, and right-side upstream third dot Dc3r are lined up rightwards, while being shifted out of alignment frontwards, in this order. A positional shift amount c31 of the right-side downstream third dot Da3r and right-side middle third dot Db3r and positional shift amount c32 of the right-side middle third dot Db3r and right-side upstream third dot Dc3r in the front-rear direction are 0.004 d, for example. In this case, the right-side third dot pattern image Dp3r is a dot pattern in the case of conveying distance that the print medium P is conveyed per unit time being longer than the predetermined conveying distance d by 0.4% of the conveying distance d, and conveying speed of the print medium P being 0.4% faster than predetermined speed d.

A ratio of such positional shift amounts of the dots D in the front-rear direction in the second dot pattern image Dp2 and third dot pattern image Dp3 is equal to a ratio of the intervals of the nozzle rows in the front-rear direction. In the front-rear direction, a ratio of the second positional shift amount being the positional shift amount c21 of the downstream second dot Da2 and middle second dot Db2 and the third positional shift amount being the positional shift amount c23 of the downstream second dot Da2 and upstream second dot Dc2 is equal to a ratio of the interval a1 of the downstream nozzle row 22a and middle nozzle row 22b and an interval a3 of the downstream nozzle row 22a and upstream nozzle row 22c. In the front-rear direction, a ratio of the positional shift amount c31 of the downstream third dot Da3 and middle third dot Db3 and a positional shift amount c33 of the downstream third dot Da3 and upstream third dot Dc3 is equal to a ratio of the interval a1 and interval a3.

Moreover, the positional shift amount of the dots D gets proportionately larger the further separated in the left-right direction they are from the first dot pattern image Dp1 at the center in the left-right direction. Whereas the positional shift amount of the dots D in the second dot pattern image Dp2 separated by one from the first dot pattern image Dp1 is 0.002 d, the positional shift amount of the dots D in the third dot pattern image Dp3 separated by two from the first dot pattern image Dp1 is 0.004 d. As a result, in the case of an $n^{th}$ (where n is a natural number) dot pattern image being separated by (n−1) dot pattern images from the first dot pattern image Dp1 at the center in the left-right direction, the positional shift amount of the dots D in the $n^{th}$ dot pattern image will be (n−1) times the positional shift amount of the dots D in the second dot pattern image Dp2.

<Printing of Correction-Pattern Image>

The controller 30 causes liquid to be discharged from the plurality of nozzles 21 in the line head 20, while at the same time causing the print medium P to be conveyed frontwards by the conveying rollers 16a, 16b, based on the print data of the correction-pattern image S. As a result, a plurality of the correction-pattern images S are printed on the print medium P with an interval being provided therebetween in the front-rear direction.

At this time, the plurality of nozzles 21 will have the same color of liquid as each other discharged therefrom, due to the plurality of nozzles 21 being provided in the same line head 20 as each other. Hence, the liquid discharged from the downstream nozzle row 22a, liquid discharged from the middle nozzle row 22b, and liquid discharged from the upstream nozzle row 22c by which the correction-pattern image S is printed, will be of the same color as each other.

Moreover, in order that, when the print medium P is conveyed a predetermined conveying distance d per unit time, liquid will be caused to land on a position of a dot D of the correction-pattern image S, the controller 30 causes the liquid to be discharged from a nozzle 21 at a time corresponding to the dot D. A relationship of the position of the dot D, the nozzle 21 discharging liquid at this position of the dot D, and the time when liquid is discharged from this nozzle 21, is predetermined and stored in the storage section 32. The discharge time of liquid from the nozzle 21 is set for each drive cycle of its corresponding drive element 18.

Now, the controller 30 causes the drive element 18 to be driven in three consecutive drive cycles, whereby liquid is continuously discharged from the nozzle 21 corresponding to the drive element 18. As a result, three dots D formed by liquid that has been discharged from the nozzle 21 are aligned in the front-rear direction. As a result, the length g of the correction-pattern image S in the front-rear direction will be a three dots D portion.

Moreover, for example, the controller 30 causes liquid to be discharged from the downstream first nozzle 21a1, downstream second nozzle 21a2, and downstream third nozzle 21a3 in the downstream nozzle row 22a at the same time as each other. As a result, the downstream first dot Da1, downstream second dot Da2, and downstream third dot Da3 will be arranged in a line in the left-right direction. Then, by discharge times of liquid of the middle first nozzle 21b1, middle second nozzle 21b2, and middle third nozzle 21b3 in the middle nozzle row 22b and upstream first nozzle 21c1, upstream second nozzle 21c2, and upstream third nozzle 21c3 in the upstream nozzle row 22c being shifted on a nozzle group basis with respect to this time, positional shift of the dots D is caused in each of the dot pattern images.

For example, a first time-difference of a time that liquid is caused to be discharged from the downstream first nozzle 21a1 and time that liquid is caused to be discharged from the middle first nozzle 21b1 in the first nozzle group N1 and a second time-difference of a time that liquid is caused to be discharged from the downstream second nozzle 21a2 and time that liquid is caused to be discharged from the middle second nozzle 21b2 in the second nozzle group N2, differ from each other. As a result, the first positional shift amount c11 in the front-rear direction of the first dot being the downstream first dot Da1 and second dot being the middle first dot Db1 and the second positional shift amount c21 in the front-rear direction of the third dot being the downstream second dot Da2 and fourth dot being the middle second dot Db2, differ from each other.

Moreover, the second time-difference includes a time-difference shorter than the first time-difference and a time-difference longer than the first time-difference. That is, in the left-side second dot pattern image Dp2l formed by the left-side second nozzle group N2l, the left-side downstream second dot Da2l, left-side middle second dot Db2l, and left-side upstream second dot Dc2l are disposed shifted out of alignment upstream in this order. On the other hand, in the right-side second dot pattern image Dp2r formed by the right-side second nozzle group N2r, the right-side downstream second dot Da2r, right-side middle second dot Db2r, and right-side upstream second dot Dc2r are disposed shifted out of alignment downstream in this order.

In contrast, in whichever of the left-side second nozzle group N2l and right-side second nozzle group N2r, the downstream second nozzle 21a2, middle second nozzle 21b2, and upstream second nozzle 21c2 are disposed shifted out of alignment upstream in this order. Therefore, the second time-difference will be shorter than the first time-difference in the left-side second nozzle group N2l, and the second time-difference will be longer than the first time-difference in the right-side second nozzle group N2r.

Figure 4:
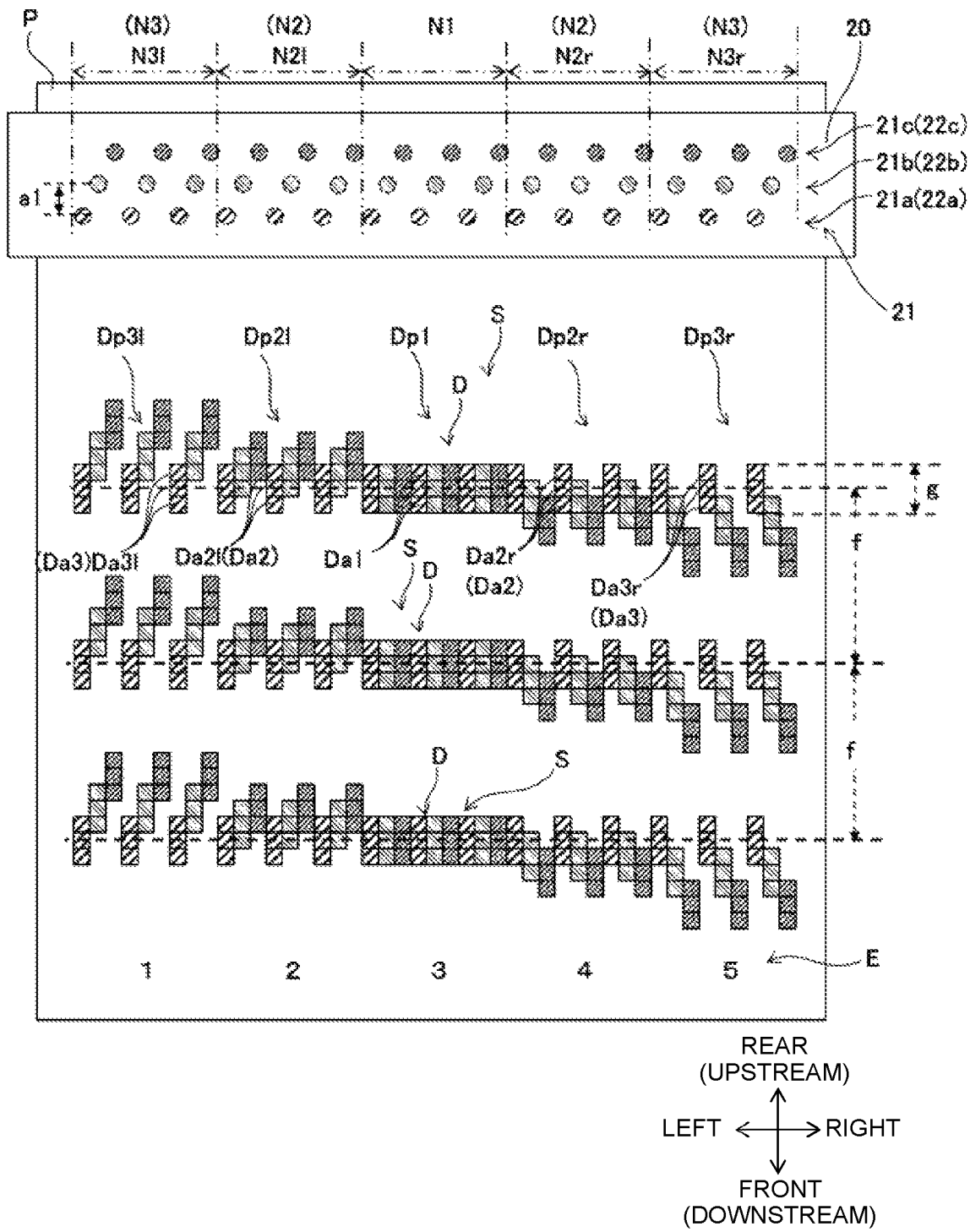
FIG. 4 is a diagram schematically depicting the head and a print medium on which the correction-pattern image has been printed, in the case of the print medium being conveyed under the head at a predetermined speed.

Moreover, as depicted in FIG. 4, the correction-pattern images S are printed on the print medium P with a predetermined interval f at a time provided therebetween. In the front-rear direction, the interval f of fellow centers of the correction-pattern images S adjacent to each other is larger than the interval a1 of the downstream nozzle row 22a and middle nozzle row 22b.

The center of the correction-pattern image S is the center of the correction-pattern image S in the front-rear direction. In the example of FIG. 4, this center is the center in the front-rear direction of the three downstream first dots Da1 aligned in the front-rear direction, center in the front-rear direction of the three downstream second dots Da2 aligned in the front-rear direction, and center in the front-rear direction of the three downstream third dots Da3 aligned in the front-rear direction, in the correction-pattern image S.

In this way, the plurality of correction-pattern images S are printed on the print medium P. At this time, identification information E of each of the dot pattern images of the correction-pattern images S is printed. For example, consecutive numbers are assigned from the left-side dot pattern image, as the identification information E. In the example of FIG. 4, "1" is printed on a front side of the plurality of left-side third dot pattern images Dp3l, "2" is printed on a front side of the plurality of left-side second dot pattern images Dp2l, "3" is printed on a front side of the plurality of first dot pattern images Dp1, "4" is printed on a front side of the plurality of right-side second dot pattern images Dp2r, and "5" is printed on a front side of the plurality of right-side third dot pattern images Dp3r.

Shapes of the correction-pattern images S printed in this way change according to moving speed of the print medium P. For example, when the print medium P is conveyed at the predetermined speed d, the correction-pattern images S depicted in FIG. 4 are formed. In the first dot pattern image Dp1 in these correction-pattern images S, the downstream first dot Da1, middle first dot Db1, and upstream first dot Dc1 are arranged in a line in the left-right direction, the positional shift amount of these dots D in the front-rear direction is 0 (zero), and the first dot pattern image Dp1 extends in the left-right direction. Hence, in the front-rear direction, the plurality of first dot pattern images Dp1 are aligned parallelly to each other with the interval f provided therebetween.

In contrast, the other dot pattern images extend in an oblique direction to each of the front-rear direction and left-right direction. The positional shift amount of the dots D in these other dot pattern images is larger than the positional shift amount of the dots D in the first dot pattern image Dp1.

Therefore, in the plurality of correction-pattern images S aligned in the front-rear direction, apparent density seems thinner in the first dot pattern image Dp1 than in the other dot pattern images. Hence, the user, on viewing the printed correction-pattern images S, inputs by the input device 13 identification information E of "3" corresponding to the first dot pattern image Dp1.

The identification information E of the dot pattern images and the positional shift amounts of the dots D are priorly corresponded. Therefore, the controller 30 corrects the conveying speed of the print medium P in accordance with the positional shift amount of the first dot pattern image Dp1, based on the identification information E that has been inputted from the input device 13. However, in this case, the positional shift amount is 0 (zero), so substantively the conveying speed of the print medium P will not change. Note that the controller 30 may correct drive time of the drive element 18, instead of the conveying speed of the print medium P.

Figure 5:
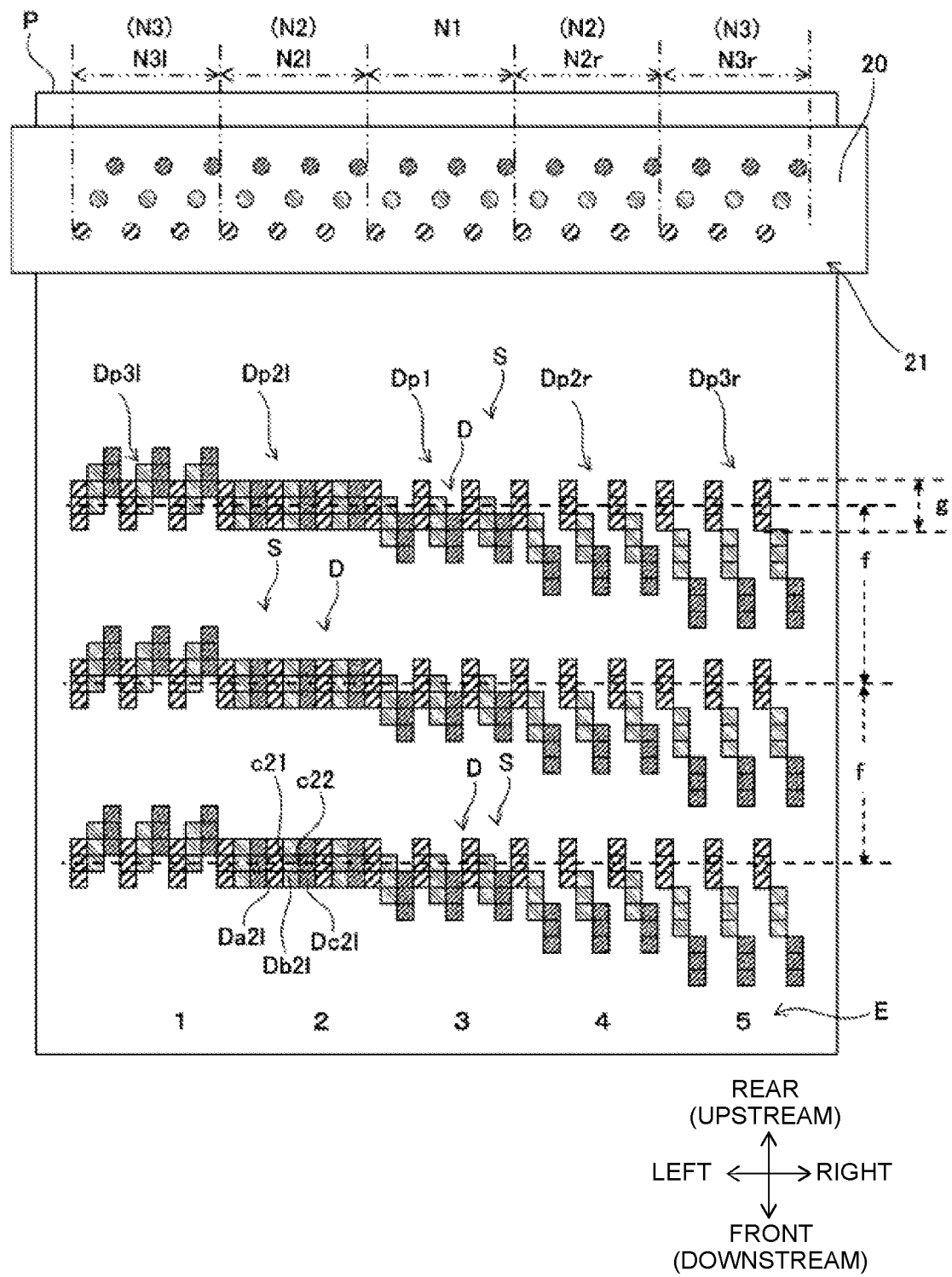
FIG. 5 is a diagram schematically depicting the head and the print medium on which the correction-pattern image has been printed, in the case of the print medium being conveyed under the head at a speed faster than the predetermined speed.

In contrast, for example, when the print medium P is conveyed 0.2% faster than the predetermined speed d, the correction-pattern images S depicted in FIG. 5 are formed. In the left-side second dot pattern image Dp2*l* in these correction-pattern images S, the left-side downstream second dot Da2*l*, left-side middle second dot Db2*l*, and left-side upstream second dot Dc2*l* are arranged in a line in the left-right direction, the positional shift amounts c21, c22 of these dots D in the front-rear direction is 0 (zero), and the second dot pattern image Dp2 extends linearly in the left-right direction. Hence, in the front-rear direction, the plurality of left-side second dot pattern images Dp2*l* are aligned parallelly to each other with the interval f provided therebetween.

In contrast, the other dot pattern images extend in an oblique direction to each of the front-rear direction and left-right direction. Therefore, in the plurality of correction-pattern images S aligned in the front-rear direction, apparent density seems thinner in the left-side second dot pattern image Dp2*l* than in the other dot pattern images. Hence, the user, on viewing the printed correction-pattern images S, inputs by the input device 13 identification information E of "2" corresponding to the left-side second dot pattern image Dp2*l*.

The controller 30 corrects the conveying speed of the print medium P in accordance with the positional shift amounts c21, c22 of the left-side second dot pattern image Dp2*l*, based on the identification information E of "2" that has been inputted from the input device 13. In this case, the identification information E and correction values of rotational speed of the conveying rollers 16*a*, 16*b* are priorly corresponded and stored in the storage section 32.

The controller 30 acquires the correction value appropriate to the identification information E from a predetermined correspondence relationship, and corrects the rotational speed of the conveying rollers 16*a*, 16*b* according to the correction value. In this case, the controller 30 performs a slowing-down correction of rotational speed of the conveying rollers 16*a*, 16*b*, in order that the print medium P will be conveyed at the predetermined speed d. As a result, liquid will land on the predetermined position of the print medium P, and a lowering of image quality due to error in conveyance of the print medium P can be reduced. Note that the controller 30 may correct drive time of the drive element 18, instead of the conveying speed of the print medium P.

Modified Example 1

In the printing apparatus 10 of modified example 1, in the above-described embodiment, the controller 30 changes the length g in the front-rear direction of the correction-pattern image S, without changing the interval f of fellow centers of the correction-pattern images S adjacent to each other in the conveying direction, according to ease-of-running of liquid in the print medium P.

Specifically, for example, ease-of-running of liquid in the print medium P differs according to a kind of the print medium P. In the case of the print medium P being paper, there may be cited as kinds of the print medium P, for example, processed paper whose surface has been applied with a coating and non-processed paper whose surface has not been applied with a coating. Moreover, non-processed paper is exemplified by the likes of plain paper, recycled paper, and fine paper, and processed paper is exemplified by the likes of glossy paper, coated paper, and matt coated paper. Note that the print medium P is not limited to paper, and may be a film made of resin or the like.

Moreover, the easier the liquid runs, the longer the length g of the correction-pattern image S in the front-rear direction will become, and, accordingly, the narrower the interval f of fellow centers of the correction-pattern images S will become. As a result, apparent density of the correction-pattern image S becomes hard to distinguish. Therefore, a correspondence relationship of kind of the print medium P and length g of the correction-pattern image S is predetermined and stored in the storage section 32, so that the length g of the correction-pattern image S will be shorter the more easily the liquid runs.

The user uses the input device 13 to input the controller 30 with the kind of print medium P as information relating to ease-of-running of liquid in the print medium P. The controller 30 acquires the length g of the correction-pattern image S corresponding to the kind of the print medium P, based on this predetermined correspondence relationship.

For example, liquid runs with more difficulty in a print medium P1 than in a print medium P2, so that ease-of-running of the liquid is smaller in the print medium P1 than in the print medium P2. In this case, as depicted in FIG. 4, the print medium P1 in which running occurs with difficulty has printed thereon in the front-rear direction by the controller 30 correction-pattern images S of a length g of three portions of dots D at intervals of the interval f corresponding to 12 dots D.

Figure 6:
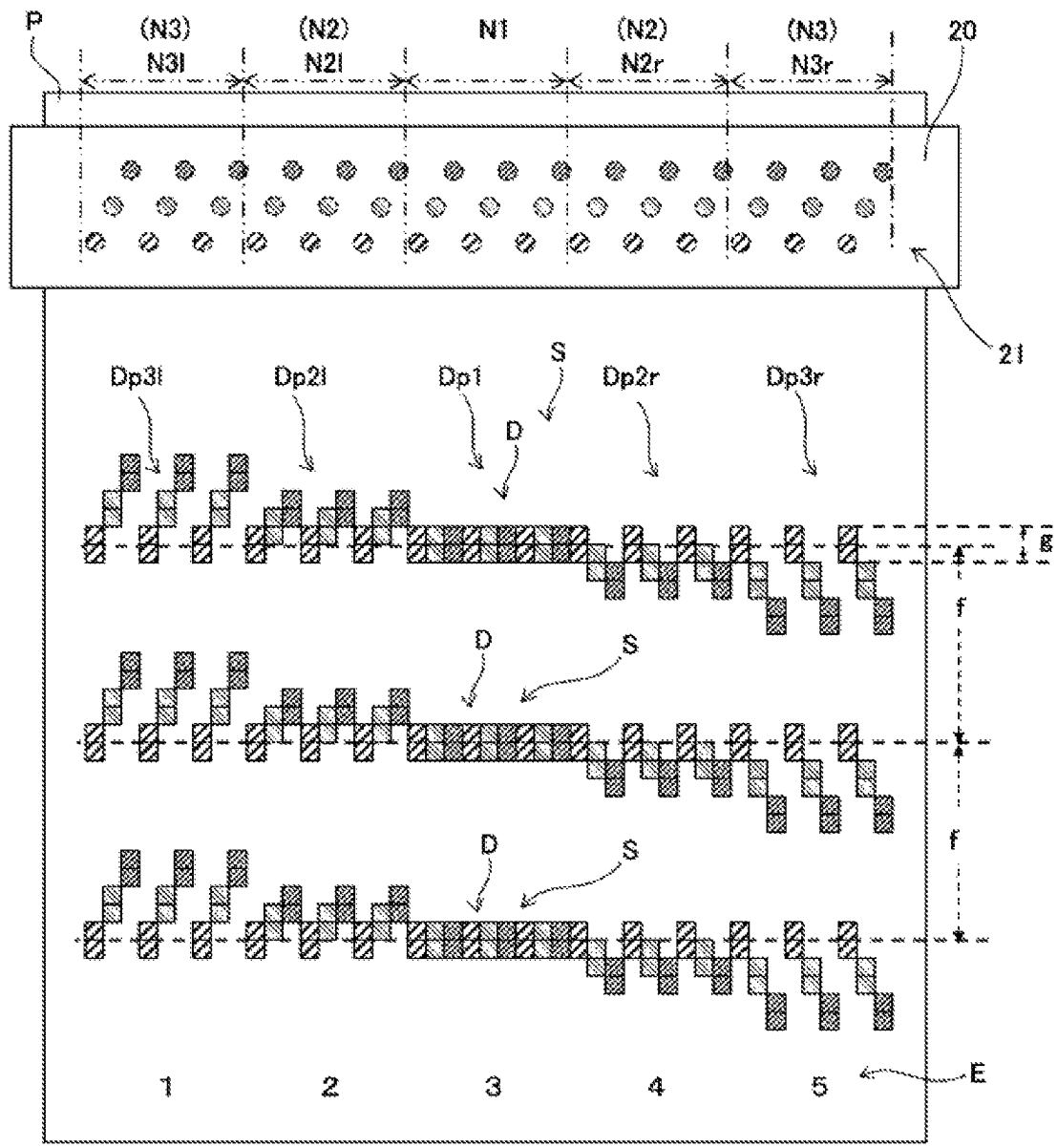
FIG. 6 is a diagram schematically depicting the head and the print medium on which the correction-pattern image has been printed, in the case of printing being performed on a print medium where running easily occurs.

In contrast, as depicted in FIG. 6, the print medium P2 in which running easily occurs has printed thereon in the front-rear direction by the controller 30 correction-pattern images S of a length g of two portions of dots D at intervals of the interval f corresponding to 12 dots D. Thus, the length g of the correction-pattern images S is made shorter the more easily the liquid runs in the print medium P.

As a result, even if running occurs in the correction-pattern images S, apparent density of the plurality of dot pattern images can be made easy to distinguish, without the interval f of the correction-pattern images S being changed. This makes it possible for the dot pattern image whose apparent density is thin to be selected from the correction-pattern images S, and for the rotational speed of the conveying rollers 16*a*, 16*b* to be corrected from the positional shift amount of that dot pattern image.

Modified Example 2

In the printing apparatus 10 of modified example 2, in the above-described embodiment, the controller 30 changes the interval f of fellow centers of the correction-pattern images S adjacent to each other in the conveying direction, without changing the length g in the conveying direction of the correction-pattern image S, according to ease-of-running of liquid in the print medium P.

Specifically, for example, a correspondence relationship of kind of the print medium P and interval f of the correction-pattern images S is predetermined and stored in the storage section 32, so that the interval f of the correction-pattern images S will be broader the more easily the liquid runs.

The user uses the input device 13 to input the controller 30 with the kind of print medium P as information relating to ease-of-running of liquid in the print medium P. In response, the controller 30 acquires the interval f of the correction-pattern images S corresponding to the kind of the print medium P, based on the predetermined correspondence relationship. Then, the controller 30 prints the plurality of correction-pattern images S on the print medium P with the interval f provided therebetween.

Making the interval f broader the more easily the liquid runs in this way results in that, even if running occurs in the correction-pattern images S, apparent density of the plurality of dot pattern images can be made easy to distinguish, without the length g of the correction-pattern image S being changed. This makes it possible for the dot pattern image whose apparent density is thin to be selected from the correction-pattern images S, and for the rotational speed of the conveying rollers 16a, 16b to be corrected from the positional shift amount of that dot pattern image.

Modified Example 3

In the printing apparatus 10 of modified example 3, in the above-described embodiment, the controller 30 changes the length g in the conveying direction of the correction-pattern image S, while at the same time changing the interval f of fellow centers of the correction-pattern images S adjacent to each other in the conveying direction, according to ease-of-running of liquid in the print medium P.

Specifically, a relationship of ease-of-running of liquid and interval f and length g of the correction-pattern images S is predetermined and stored in the storage section 32, so that the interval f of the correction-pattern images S will be broader and their length g shorter the more easily the liquid runs.

The user uses the input device 13 to input the controller 30 with the kind of print medium P as information relating to ease-of-running of liquid in the print medium P. In response, the controller 30 acquires the interval f and length g of the correction-pattern images S corresponding to the kind of the print medium P, based on the predetermined correspondence relationship. Then, the controller 30 prints correction-pattern images S of the length g on the print medium P with the interval f provided therebetween.

Making the interval f broader and length g shorter the more easily the liquid runs in this way results in that, even if running occurs in the correction-pattern images S, apparent density of the plurality of dot pattern images can be made easy to distinguish. This makes it possible for the dot pattern image whose apparent density is thin to be selected from the correction-pattern images S, and for the rotational speed of the conveying rollers 16a, 16b to be corrected from the positional shift amount of that dot pattern image.

Other Modified Examples

In the above-described embodiment and modified examples, the dot pattern image having a small positional shift amount of dots D was selected by the user based on apparent density of the dot pattern images, and the selected dot pattern image was inputted to the controller 30 by the user using the input device 13. However, a method of selecting the dot pattern image of small positional shift amount is not limited to this.

For example, the printing apparatus 10 may comprise a scanner 40, as depicted in FIG. 1. The scanner 40 is disposed downstream of the line head 20 in the conveying direction of the print medium P. The scanner 40 scans the correction-pattern image S that has been printed on the print medium P by the line head 20, and outputs the scanned image to the controller 30. The controller 30 acquires shapes of each of the dot pattern images in this image, selects the dot pattern image having a small positional shift of dots D in the front-rear direction, and acquires position of the selected dot pattern image in the left-right direction or its identification information.

The controller 30 corrects the rotational speed of the conveying rollers 16a, 16b so that the print medium P will be conveyed at the predetermined speed d, based on the position or identification information of the selected dot pattern image. As a result, liquid will land on the predetermined position of the print medium P, and a lowering of image quality due to error in conveyance of the print medium P can be reduced.

In the above-described embodiment and all modified examples, the kind of print medium P was employed as information relating to ease-of-running of liquid in the print medium P. However, information relating to ease-of-running of liquid is not limited to this. For example, in the case that ease-of-running of liquid in the print medium P has been priorly divided into levels, this level of ease-of-running may be employed as the information relating to ease-of-running of the liquid.

In the above-described embodiment and all modified examples, the information relating to ease-of-running of liquid in the print medium P was inputted to the controller 30 by the input device 13. However, a method of inputting is not limited to this. For example, information relating to ease-of-running of liquid may be included in the print data, and the controller 30 may acquire from the print data the information relating to ease-of-running of the liquid.

In the above-described embodiment and modified examples, the line head 20 adopted a system employing a piezoelectric element (a piezo-system) for the drive element 18. However, a system adopted by the line head 20 is not limited to this system. For example, the line head 20 may adopt a thermal system employing a heat-generating body for the drive element 18, or an electrostatic system employing a conductive vibrating plate and electrode for the drive element 18.

In the above-described embodiment and modified examples, the controller 30 may acquire change in shape of the correction-pattern image S every revolution of the conveying rollers 16a, 16b. For example, sometimes, a cross section orthogonal to a central axis of the conveying rollers 16a, 16b will deform from a circular shape, and rotational speed of the conveying rollers 16a, 16b will cyclically change. In this case, shape of the correction-pattern image S will cyclically change according to the change in rotational speed of the conveying rollers 16a, 16b. In response, the controller 30 corrects rotational speed of the conveying rollers 16a, 16b in accordance with cyclical change in shape of the correction-pattern image S. As a result, lowering of image quality due to cyclical error in conveyance of the print medium can be reduced.

Note that the above-described embodiment and modified examples may be combined with each other unless mutually exclusive. Moreover, numerous improvements or other embodiments of the present teaching will be obvious to a person skilled in the art from the above description. Hence, the above description should be interpreted merely as an exemplification, and is provided with an object of teaching a person skilled in the art the best mode of carrying out the present teaching. Details of structure and/or function of the present teaching may be substantively changed in a range not departing from the spirit of the present teaching.

What is claimed is:

1. A printing apparatus comprising:

a conveying roller configured to convey a print medium in a conveying direction;

a line head having a first nozzle row and second nozzle row arranged in the conveying direction, each of the first nozzle row and the second nozzle row including a plurality of nozzles aligned along a width direction orthogonal to the conveying direction, the nozzles being configured to discharge liquid, the nozzles of the first nozzle row and the nozzles of the second nozzle row being shifted in the width direction; and a controller, wherein the first nozzle row includes: a plurality of first nozzles forming a group; and a plurality of second nozzles forming a group adjacently, in the width direction, to the group of the first nozzles in the first nozzle row, the second nozzle row is positioned upstream in the conveying direction from the first nozzle row and includes: a plurality of first nozzles forming a group; and a plurality of second nozzles forming a group adjacently, in the width direction, to the group of the first nozzles in the second nozzle row, the controller is configured to:

store print data of a correction-pattern image in which a first positional shift amount between a first dot and a second dot in the conveying direction and a second positional shift amount between a third dot and a fourth dot in the conveying direction differ from each other, the first dot being a landing position on the print medium of the liquid discharged from one of the first nozzles in the first nozzle row, the second dot being a landing position on the print medium of the liquid discharged from one of the first nozzles in the second nozzle row, the third dot being a landing position on the print medium of the liquid discharged from one of the second nozzles in the first nozzle row, the fourth dot being a landing position on the print medium of the liquid discharged from one of the second nozzles in the second nozzle row; and cause the liquid to be discharged from the nozzles while causing the print medium to be conveyed, such that a plurality of the correction-pattern images will be printed on the print medium based on the print data with an interval being provided therebetween in the conveying direction.

2. The printing apparatus according to claim 1, wherein the second nozzles in the first nozzle row include: a plurality of one-side second nozzles forming a group adjacently on one side in the width direction to the group of the first nozzles in the first nozzle row; and a plurality of other-side second nozzles forming a group adjacently on the other side in the width direction to the group of the first nozzles in the first nozzle row, the second nozzles in the second nozzle row include: a plurality of one-side second nozzles forming a group adjacently on one side in the width direction to the group of the first nozzles in the second nozzle row; and a plurality of other-side second nozzles forming a group adjacently on the other side in the width direction to the group of the first nozzles in the second nozzle row, the correction-pattern image includes:

a first dot pattern image including the first dot and the second dot;

a one-side second dot pattern image including:
a one-side third dot corresponding to one of the one-side second nozzles in the first nozzle row; and
a one-side fourth dot corresponding to one of the one-side second nozzles in the second nozzle row; and an other-side second dot pattern image including:
an other-side third dot corresponding to one of the other-side second nozzles in the first nozzle row; and
an other-side fourth dot corresponding to one of the other-side second nozzles in the second nozzle row, in the one-side second dot pattern image, the one-side third dot is positioned downstream in the conveying direction from the one-side fourth dot, in the other-side second dot pattern image, the other-side third dot is positioned upstream in the conveying direction from the other-side fourth dot, and the first positional shift amount in the first dot pattern image is smaller than a one-side second positional shift amount in the conveying direction between the one-side third dot and the one-side fourth dot in the one-side second dot pattern image, and the first positional shift amount in the first dot pattern image is smaller than an other-side second positional shift amount in the conveying direction between the other-side third dot and the other-side fourth dot in the other-side second dot pattern image.

3. The printing apparatus according to claim 1, wherein the line head further includes a third nozzle row arranged in the conveying direction with respect to the first nozzle row and the second nozzle row, the third nozzle row is positioned upstream in the conveying direction from the second nozzle row, the third nozzle row includes a plurality of nozzles aligned in the width direction, the nozzles in the third nozzle row are shifted in the width direction with respect to the nozzles of the first nozzle row and the nozzles of the second nozzle row, the third nozzle row includes: a plurality of first nozzles forming a group; and a plurality of second nozzles forming a group adjacently in the width direction to the group of first nozzles in the third nozzle row, and a ratio of a third positional shift amount and the second positional shift amount is equal to a ratio of an interval in the conveying direction between the third nozzle row and first nozzle row and an interval in the conveying direction between the second nozzle row and first nozzle row, the third positional shift amount being a positional shift amount in the conveying direction between the third dot and a fifth dot, which is a landing position on the print medium of the liquid discharged from one of the second nozzles in the third nozzle row.

4. The printing apparatus according to claim 1, wherein in the conveying direction, an interval between centers of the correction-pattern images adjacent to each other is larger than an interval between the first nozzle row and the second nozzle row.

5. The printing apparatus according to claim 1, wherein a first time-difference is a time difference between a time at which the liquid is discharged from the first nozzles in the first nozzle row and a time at which the liquid is discharged from the first nozzles in the second nozzle row, a second time-difference is a time difference between a time at which the liquid is discharged from the second nozzles in the first nozzle row and a time at which the liquid is discharged from the second nozzles in the second nozzle row, and the first time-difference and the second time-difference are different from each other.

6. The printing apparatus according to claim 5, wherein the second time-difference includes a time-difference shorter than the first time-difference and a time-difference longer than the first time-difference.

7. The printing apparatus according to claim 1, wherein a color of the liquid discharged from the first nozzle row and a color of the liquid discharged from the second nozzle row are the same as each other.

8. The printing apparatus according to claim 1, wherein the printing apparatus is configured to change length in the conveying direction of the correction-pattern image, without changing interval between centers of the correction-pattern images adjacent to each other in the conveying direction, according to ease-of-running of the liquid in the print medium.

9. The printing apparatus according to claim 8, further comprising an input device configured to input, to the controller, information relating to the ease-of-running of the liquid in the print medium.

10. The printing apparatus according to claim 1, wherein the printing apparatus is configured to change interval between centers of the correction-pattern images adjacent to each other in the conveying direction, without changing length in the conveying direction of the correction-pattern image, according to ease-of-running of the liquid in the print medium.

11. The printing apparatus according to claim 1, wherein the printing apparatus is configured to change length in the conveying direction of the correction-pattern image, while changing interval between centers of the correction-pattern images adjacent to each other in the conveying direction, according to ease-of-running of the liquid in the print medium.

* * * * *